United States Patent [19]

Daly et al.

[11] Patent Number: 5,422,396
[45] Date of Patent: Jun. 6, 1995

[54] HEAT-RESISTANT COATING POWDER

[75] Inventors: Andrew T. Daly, Sinking Spring; Leo T. Grundowski, Reading, both of Pa.

[73] Assignee: Morton International, Inc., Chicago, Ill.

[21] Appl. No.: 240,408

[22] Filed: May 10, 1994

Related U.S. Application Data

[63] Continuation-in-part of Ser. No. 88,997, Jul. 9, 1993, abandoned.

[51] Int. Cl.6 .............................................. C08F 8/42
[52] U.S. Cl. .................................... 525/106; 525/100; 524/506; 428/447; 428/523
[58] Field of Search ................ 525/100, 106; 524/506; 428/447

[56] References Cited

U.S. PATENT DOCUMENTS 4,968,751 11/1990 Miles et al. ......................... 525/100

Primary Examiner—Melvyn I. Marquis
Assistant Examiner—Margaret W. Glass
Attorney, Agent, or Firm—Wayne E. Nacker; Gerald K. White

[57] ABSTRACT

A heat-resistant coating powder is comprised of A) between about 20 and about 83 wt % based on resin content of A) plus B) of a silicone resin having organic moieties selected from aryl and $C_1$–$C_4$ alkyl, a degree of substitution of about 1.5 or less, and an —OH content of between about 2.5 and about 7.5 wt. %, B) between about 17 wt % and about 80 wt % based on resin content of A) plus B) of an acrylic resin having an acid number of between about 20 and about 100 and a hydroxyl number of about 5 or below, and C) an acid-reactive cross-linking agent(s) at a stoichiometry of between about 70 and about 110% of the acid functionality of said acrylic resin B).

4 Claims, No Drawings

HEAT-RESISTANT COATING POWDER

This application is a C-I-P of U.S. Ser. No. 08/088,997 filed Jul. 9, 1993, now abandoned.

The present invention is directed to powder coating using coating powders that produce heat-resistant finishes, and more particularly to coating powders based on silicone resins.

BACKGROUND OF THE INVENTION

It is well known that coatings or paints incorporating silicone resins have high heat resistance. Heretofore, silicone-containing coatings were generally liquid coatings employing silicone as a binder. Most prior art silicone-containing coatings are solvent-based and have the disadvantage of high VOCs. Water-borne silicone-containing coatings are also known, but even these generally contain some solvent. It is an object of the present invention to provide a silicone resin-containing coating powders. Powder coatings have the advantage of having no organic solvents. Furthermore, overspray coating powder is completely recoverable and reusable.

Liquid silicone resin-containing coatings are known to contain silicone resin-compatible co-binders, such as alkyds, acrylics, epoxies, melamine resins, polyesters and polyurethanes. The most common co-binders in liquid silicone resin-containing coatings are polyesters. The co-binder resins are used to provide initial properties of the coating. Silicone resins cure slowly and at elevated temperatures. Co-binders, such as polyesters, are more rapidly curable and are curable at lower temperatures.

Silicone-based coating powders have been previously produced, e.g., U.S. Pat. No. 3,170,890, the teachings of which are incorporated herein by reference, using epoxy resins as co-resins; however, the finishes produced from these resins have poor weatherability.

U.S. Pat. No. 4,879,344 to Woo et al., the teachings of which are incorporated herein by reference, describes coating powders which are a mixture of a hydroxy-functional acrylic resin and silicone. It is found, however, that in using hydroxy-functional acrylic resins, out-gassing occurs when the coating is fused and/or cured onto the substrate.

U.S. Pat. No. 4,968,751 to Miles et al. is directed to acrylic/silicone resins in which the acrylic resin has significant hydroxyl functionality so as to react with the silicone resin, plus phosphonium salt to catalyze the reaction between the hydroxyl functional acrylic resin and the silicone resin. This reaction out-gasses water.

U.S. Pat. No. 5,280,098 is directed to an epoxy-functional silicone resin. Compositions may also contain acrylic resin. The silicone resin is very highly substituted with epoxy-containing moieties as well as other organic moieties. The silicone resin has no silanol (Si—O—H) functionality.

SUMMARY OF THE INVENTION

In accordance with the present invention a coating powder comprises between about 20 and about 83 wt % (preferably between about 30 and about 60 wt %) of A) a silicon resin and between about 17 and about 80 wt % (preferably between about 40 and about 70 wt %) of B) an acid functional acrylic co-resin, said weight percentages based on A)+B). The coating powder also contains C) an acid-reactive cross-linking agent or agents at a stoichiometry of between about 70 and about 110% (preferably about 80–100%) of the acid functionality of the acrylic resin. Finishes produced by coating with the powder have structural integrity, good weatherability and high-temperature stability.

DETAILED DESCRIPTION OF CERTAIN PREFERRED EMBODIMENTS

Suitable silicone resins A) for use in the invention are discussed in "Silicones in Protective Coatings" by Lawrence H. Brown in *Treatise on Coatings* Vol. 1, Part III "Film-Forming Compositions" PP. 513–563, R. R. Meyers and J. S. Long eds. Marcel Dekker, Inc. New York, 1972, the teachings of which are incorporated herein by reference. Suitable silicone resins are also described in U.S. Pat. Nos. 3,585,065 and 4,107,148, the teachings of which are incorporated herein by reference, as well as above-referenced U.S. Pat. Nos. 3,170,890 and 4,879,344. The organic moieties of the silicone resins are aryl, particularly phenyl, or short chain ($C_1$-$C_4$) alkyl. For good heat resistance, methyl and phenyl groups are the organic moieties of choice. Generally, the more phenyl groups, the higher heat-resistance provided. For forming powder coatings, the silicone resins should be solid at room temperature and preferably have a $T_g$ of at least about 45° C. Examples of such silicone resins are phenylsilicone SY-430, sold by Wacker Silicone, Consohockon, Pa., having an average molecular wt. of about 1700, methylsilicone MK also sold by Wacker and methylphenylsilicone 6-2230 sold by Dow Corning.

For high temperature stability, silicon resins useful in the invention have a degree of substitution as described in *Silicones in Protective Coatings*, supra of about 1.5 or less, typically between about 1 and about 1.5. Specifically, degree of substitution is defined as the average number of substituent groups per silicon atom and is the summation of the mole percent multiplied by the number of substituents for each ingredient. Silicon resins are used which self-condense at high end-use temperatures, e.g., that of a barbecue grill or an automobile exhaust part. This requires siloxane functionality (Si—O—H), and silicone resins used herein have an —OH content of between about 2.5 and about 7.5 wt. % of the silicone resin.

Attempts to make coating powders using silicone resin as the only polymeric material were unsuccessful as the coating developed microcracks after thermoshock and had poor solvent resistance. It was then attempted to incorporate polyester along with the silicone resin, as is conventionally done in liquid coating formulations. However, the coatings resulting from such polyester formulations developed severe cracking. Why polyester as a co-resin with silicone resin works well in liquid coatings but not in coating powders is not known, but the difference may be a result of the necessary thickness of coatings produced from coating powders, i.e., powder coating finishes are at least about 1.5 mil thick. Formulations were also prepared using hydroxyl-functional acrylic resins, but, as noted above, out-gassing occurred when the coatings are applied to the substrate.

Herein, it is found that acid-functional acrylic resins B) are useful in coating powders as co-resins with silicone resins. The acrylic resin gives the coating initial physical properties, while the silicone resin gives the coating heat-resistance. For example, it is typical to apply a coating to a substrate and subsequently bake the coating on the substrate at a lower temperature than the temperature to which the part will be subjected. At such lower temperature, the acrylic resin forms the primary binder, while the silicone may have undergone a relatively minor degree of curing. At higher temperatures to which the coated substrate may be subjected, the acrylic resin may even decompose entirely as the silicone resin more fully cures. Thus, for example, an automobile exhaust component or a barbecue grill may be coated and heat-treated to a temperature, e.g., 400° F. (204° C.), whereat the acrylic resin forms a film and serves a primary binding function. In use, the automobile exhaust component or barbecue grill may be subjected to higher temperatures at which the silicone resin further cures to provide a durable heat-resistant coating. While applicants are not bound by any theory, it is found that silicone coatings using acid-functional acrylic co-resins adhere well initially to substrates without visible cracking and are resistant to high temperatures, even up to 1200° F. (650° C.).

The acrylic resin should have a $T_g$ of at least about 45° C., and typically has an ICI viscosity of between about 30 and about 80 poise. For processing to form the coating powder and for film forming, the acrylic polymer should have a typical softening point of about 100° C. or below. Suitable acrylic resins have acid numbers of between about 20 and about 100, preferably between about 40 and about 60. Hydroxyl functionality reacts with silanol functional, releasing water. Reaction between —OH functional acrylic resin and the silicon resin, as per U.S. Pat. No. 4,968,751, is preferably avoided. To avoid out-gassing, the hydroxyl number should be below about 5, preferably zero or essentially zero. The acrylic resins are formed from typical acrylic monomers known in the art, such as methyl acrylate, methyl methacrylate, ethyl acrylate, acrylic acid, methacrylic acid, butyl acrylate, butyl methacrylate, etc. Styrene or alpha-methyl styrene monomers may also be incorporated, particularly to increase glass transition temperature of the acrylic copolymer.

The acid-reactive cross-linking agent C) or agents for the acrylic resin is added to between about 70 and about 110%, preferably between about 80 and about 100% of the stoichiometry of the acid functionality of the acrylic resin. A typical cross-linking agent for acid functionality is triglycidal isocyanourate (TGIC). Other suitable acid-reactive cross-linking agents include hydroxyl alkyl amides, and polyepoxides, including aliphatic polyepoxides. The degree of cross-linking desired, if any, will depend upon the desired initial properties of the coating.

The coating powder may optionally, but preferably, contain a cure catalyst for the silicone resin, such as Zn acetylacetonate. Use levels for silicone cure catalyst is typically between about 0.1 and about 1 wt % relative to the total weight of resins A) plus B).

Coatings according to the invention may be clear, containing no pigment or filler, or may contain pigment or filler, typically up to about 100 wt % relative to the total weight of acrylic resin A) and silicone resin B). Preferably, filler, if used, is used at between about 5 and about 50 wt % relative to the combined weight of A) and B). Minor components known in the art, such as flow aids to prevent cratering, may also be included in the coating powder.

Coating powders in accordance with the present invention are formed in a conventional manner. The components of the coating powder are batched and shaken, e.g., for 5 minutes, to blend well. The materials are then extruded, e.g., at 250° F. in a Buss single screw extruder, allowed to cool, chipped, ground and screened to obtain a powder of appropriate size. Average particle size is typically 20–80 microns. Scalping at 100 mesh is typical to remove coarse particles. There is typically about 10% by weight of particles below 10 microns. The amount of material retained on a 325 mesh is typically between about 30 and 50 wt. %. The powder is then applied in a conventional manner, e.g., electrostatically, to a substrate. The substrate is heated at the time of application and/or subsequently so that the coating particles form a continuous film, and, if a curing agent for the acrylic resin, effect the cure.

The invention will now be described in greater detail by way of specific example.

EXAMPLE

Coating powders of the following formulations were prepared.

|  | PHR |
|---|---|
| Formulation 1: Black Coating Powder According To The Present Invention | |
| 6-2230 - Dow Corning, methyl phenyl (silicone resin) | 100 |
| SCX-817 - S.C. Johnson, acid functional (acrylic resin) | 62.5 |
| PT-810 - Ciba Geigy TGIC (curing agent) | 6.25 |
| Zinc Acetylacetonate (catalyst) | 0.25 |
| Shepherd Black 1 (pigment) | 25 |
| P-67 (flow aid) | 1.25 |
| Uraflow B (flow aid) | 0.63 |
| Suzorite 325 (mica filler) | 100 |
| Formulation 2: | |
| Silicone Only Coating Powder | |
| 6-2230 - Dow Corning silicone resin | 100 |
| Zinc acetylacetonate | .5 |
| Shepherd Black 1 | 20 |
| P67 | 2 |
| Uraflow B | 1 |
| Suzorite 325 | 80 |
| Formulation 3: | |
| Silicone/Polyester Coating Powder | |
| Ruco 103 - hydroxyl functional polyester | 10 |
| 6-2230 - Dow Corning silicone | 100 |
| P-67 - Estron (flow aid) | 2 |
| Uraflow B (flow aid) | 1 |
| Zn acetylacetonate (catalyst) | 0.5 |
| Raven 22 (pigment) | 3.0 |
| Suzorite 325 | 50 |

These powders were sprayed by electrostatic spray gun to a film thickness of 1.5–2.5 mils and cured for 15 min. @400° F. on cold rolled steel Q-panels in an electric air circulating oven. Properties are as follows:

| Formulation: | 1 | 2 | 3 |
|---|---|---|---|
| Gel time @ 400° F. | 43 Sec. | 81 Sec. | 107 Sec. |
| HPMF @ 375° F. | 47 mm | 53 mm | 27 mm |
| 60° Gloss | 30 | 3 | 27 |
| Impact Direct | 160 | 160 | 160 |
| MEK Resistance (50 Double Rubs) | Slight Rub off | Moderate rub off | Moderate rub off |
| Blistering 16 hrs. @ 600° F. | No | No | Yes |
| Thermoshock* | No Cracks | Few Micro Cracks | Severe Cracking |

*Thermoshock test was run by heating panel 20 min. @ 700° F. and quenching in water. The coatings are evaluated under microscope for cracking.

The above results clearly show the advantage of using acrylic as a co-resin in heat-resistant formulations.

Formulation 1 with acrylic co-resin was the only formulation evaluated that did not blister or crack.

Properties of the thermoshocked formula coating are as follows:

| Formulation: | 1 | 2 | 3 |
| --- | --- | --- | --- |
| Gloss | 4 | 2 | DELAMINATES |
| Impact Resistance 100 in lb. direct | Pass | Fail | |
| MEK Rub | Very Slight Rub Off | Very Slight Rub Off | |
| Pencil Hardness | 6H | 6H. | |

What is claimed is:

1. A coating powder comprising
   A) between about 20 and about 83 wt % based on resin content of A) plus B) of a silicone resin having organic moieties selected from the group consisting of aryl and $C_1$–$C_4$ alkyl, a degree of substitution of about 1.5 or less, and an —OH content of between about 2.5 and about 7.5 wt. %,
   B) between about 17 wt % and about 80 wt % based on resin content of A) plus B) of an acrylic resin having an acid number of between about 20 and about 100 and a hydroxyl number of about 5 or below, and
   C) an acid-reactive cross-linking agent(s) at a stoichiometry of between about 70 and about 110% of the acid functionality of said acrylic resin B).

2. A coating powder according to claim 1 wherein said coating powder contains pigment and/or filler at between about 5 and about 100 parts by weight relative to A) plus B).

3. A coating powder according to claim 1 wherein said acrylic resin has an acid number of between about 40 and about 60.

4. A substrate having a coating formed from the coating powder of claim 1.

* * * * *